(12) United States Patent
Gottlieb

(10) Patent No.: US 7,014,124 B2
(45) Date of Patent: Mar. 21, 2006

(54) AUTOMATED AIR FLOW SYSTEM AND METHOD

(76) Inventor: Kirk Andrew Gottlieb, 606 View Ridge Dr., Pacifica, CA (US) 94044

( * ) Notice: Subject to any disclaimer, the term of this patent is extended or adjusted under 35 U.S.C. 154(b) by 0 days.

(21) Appl. No.: 10/733,056

(22) Filed: Dec. 11, 2003

(65) Prior Publication Data

US 2005/0127196 A1   Jun. 16, 2005

(51) Int. Cl.
*F24F 7/00* (2006.01)
*F24F 3/00* (2006.01)
*F25D 17/04* (2006.01)

(52) U.S. Cl. ............. 236/49.3; 236/51; 236/1 B; 62/186; 165/205

(58) Field of Classification Search ......... 236/49.3, 236/51, 1 B; 62/179, 186, 178; 165/205, 165/208, 209, 212, 218; 454/256, 333
See application file for complete search history.

(56) References Cited

U.S. PATENT DOCUMENTS

| | | | | |
|---|---|---|---|---|
| 4,273,283 A | * | 6/1981 | Edwards | .......... 236/49.5 |
| 4,417,687 A | * | 11/1983 | Grant | .......... 236/9 A |
| 4,479,604 A | * | 10/1984 | Didner | .......... 236/49.3 |
| 4,824,012 A | | 4/1989 | Tate | |
| 4,838,483 A | | 6/1989 | Nurczyk et al. | |
| 4,931,948 A | | 6/1990 | Parker et al. | |
| 4,969,508 A | * | 11/1990 | Tate et al. | .......... 165/209 |
| 5,271,558 A | * | 12/1993 | Hampton | .......... 236/49.3 |
| 5,348,078 A | * | 9/1994 | Dushane et al. | .......... 165/209 |
| 5,449,112 A | * | 9/1995 | Heitman et al. | .......... 236/49.3 |
| 5,810,245 A | | 9/1998 | Heitman et al. | |
| 6,685,556 B1 | * | 2/2004 | Bertin | .......... 454/256 |
| 6,692,349 B1 | * | 2/2004 | Brinkerhoff et al. | .......... 454/256 |

* cited by examiner

*Primary Examiner*—Marc Norman

(57) ABSTRACT

The disclosed embodiments provide and automated air flow system and method. An automated register is coupled to at least one sensor for providing data associated with a structure. The automated register is configured to automatically provide air flow into the structure in response to the sensor data. A base station in communication with the automated register is adapted to be coupled to an air flow source. The base station receives status data from the automated register and is configured to control the air flow source based on the status data.

20 Claims, 5 Drawing Sheets

AUTOMATED AIR FLOW SYSTEM AND METHOD

TECHNICAL FIELD

The disclosed embodiments relate generally to heating, ventilation and air conditioning systems and methods, and in particular to an automated air flow system and method.

BACKGROUND

Air flow systems used in residential and commercial structures typically include a single thermostat connected to a central heating and/or air conditioning system. Air is received through an intake vent, heated or cooled, then circulated through one or more rooms via a fan connected to an air duct system. In each room or zone of the structure there is one or more vents or registers connected to the air duct system than can be manually opened or closed by moving a mechanical lever on the register. The registers are typically located in the floor or on the ceiling.

A major drawback of conventional air flow systems is the inability to efficiently heat or cool all zones to a target temperature. For example, when the zone that contains the thermostat reaches the target temperature, the air flow system is turned-off, even if all of the other zones have not yet reached the target temperature. Rooms located on the opposite side of the structure or on another floor may be significantly cooler or warmer than the room containing the thermostat.

While some systems allow the air flow system to be manually turned on by the occupant (e.g., disconnected from the thermostat), this technique consumes energy and requires the occupant to examine each room to see if the desired temperature has been reached before turning off the air flow source. Clearly, this is an impractical solution for structures with many zones or for occupants with physical disabilities.

Registers can also be used to control air flow into a room. If a particular room is too hot or too cold, the register can be manually closed using a mechanical lever to prevent the air from entering the room. Registers, however, are not always accessible because of their location (e.g., on the ceiling) or because they are obstructed (e.g., in the floor and covered by heavy furniture). Moreover, the opening and closing of a register may have to be performed several times a day to maintain the desired room temperature due to leakage from imperfect insulation or occupants leaving and entering the room.

Another problem typically found with residential systems is the inability to automatically heat or cool rooms to different target temperatures. Individuals have different sensitivities to temperature. Thus, by heating or cooling all rooms to the same temperature, some of the occupants may find the target temperature to be uncomfortable.

Accordingly, there is a need for an automated air flow system and method of heating or cooling zones of a structure to one or more target temperatures without having to manually open or close registers. Such a system and method should be energy efficient by controlling the air flow source to heat or cool selected zones until the one or more target temperatures are reached.

SUMMARY

The disclosed embodiments overcome the deficiencies of conventional air flow solutions by providing an automated air flow system for controlling the flow of conditioned air into multiple zones of a structure.

In some embodiments, an automated register is configured to receive temperature data from at least one temperature sensor in at least one zone and to control the flow of conditioned air into the at least one zone in response to the temperature data. A base station in communication with the automated register is adapted to be coupled to an air flow source for providing the conditioned air. The base station is configured to receive status data from the automated register and to control the air flow source based on the status data.

In some embodiments, a method of automatically controlling the flow of conditioned air into multiple zones of a structure comprises: specifying target temperatures for a plurality of zones, wherein at least two zones have different target temperatures; enabling an air flow source to provide conditioned air to each zone using an automated register until each zone reaches its respective target temperature; responsive to a zone reaching its target temperature, automatically redirecting the conditioned air from that zone to zones that have not reached their respective target temperatures by closing the automated register; and responsive to the closure of the automated register, substantially preventing the air source from providing conditioned air to the zones.

In some embodiments, an automated air flow system for controlling the flow of conditioned air into multiple zones of a structure, comprises a plurality of automated registers. Selected ones of the plurality of automated registers are located in zones that have reached target temperatures and are configured to automatically redirect conditioned air to zones which have not reached target temperatures. At least two zones have different target temperatures. A base station is adapted to be coupled to an air source for providing conditioned air to the zones. The base station is configured to turn-off the air source in response to status data from the automated registers indicating that all the zones have reached their respective target temperatures.

The automated air flow systems and methods disclosed herein can heat or cool one or more zones of a structure to one or more target temperatures without requiring an occupant to manually open or close a register. The systems and methods disclosed herein provide energy efficient control of air flow into selected zones until the one or more target temperatures are reached.

DESCRIPTION OF EMBODIMENTS

System Architecture

Figure 1:
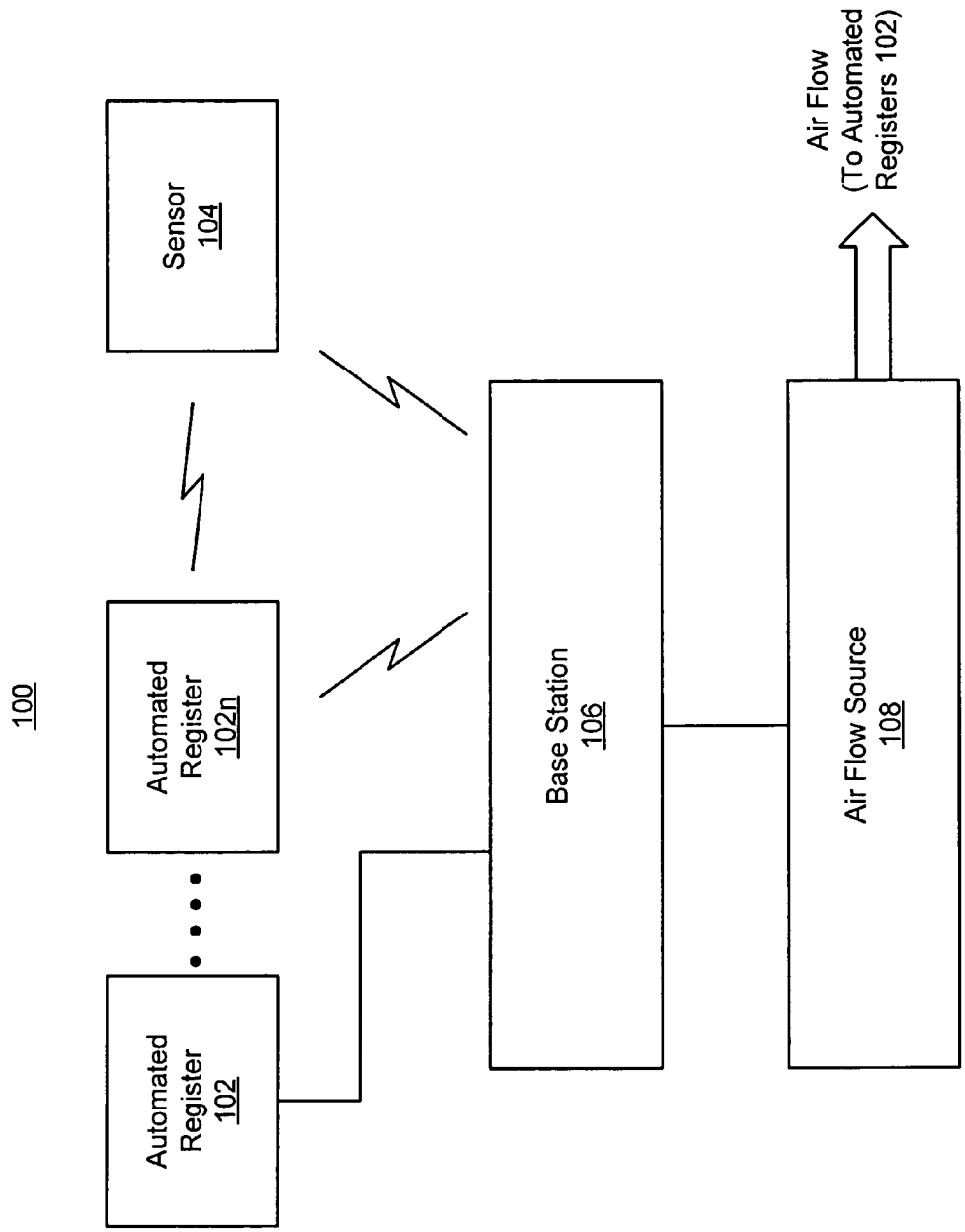
FIG. 1 is a block diagram of an automated air flow system.

FIG. 1 is a block diagram of an automated air flow system. In one embodiment, the automated air flow system 100 generally includes one or more automated register(s) 102a, . . . 102n, a base station 106 and an air flow source 108.

The automated registers 102 can be installed in one or more zones of a residential or commercial structure. The form factor for the automated registers 102 preferably includes standard dimensions to facilitate the installation of the automated registers in existing heating ducts. In some embodiments, this can be achieved by extending the form factor of the automated register 102 in a direction perpendicular to the plane of the register.

An example of a register that can be used in the automated air flow system 100 is the MicroFlow 2000™ automated ceiling register, manufactured by Automated Ceiling Registers LLC (Plano, Tex.). Control of the MicroFlow 2000™ can be accomplished at the point of entry, from a remote location, under time or temperature control, or under programmed or wireless remote control using X10 home automation products.

The automated register 102 communicates with one or more sensors 104 via physical links (e.g., Ethernet, phone lines, etc.) and/or wireless links. The sensors 104 can include temperature detectors, motion detectors, sound detectors, light detectors, or any combination thereof. The automated registers 102 also communicate with one or more base stations 106 via physical and/or wireless links. Note that the automated air flow system 100 can include any number of automated registers 102, sensors 104 and base stations 106, which can be interconnected as desired using physical and/or wireless links.

In some embodiments, the base station 106 can replace an existing programmable thermostat by connecting it to the existing electrical wiring connected to the on/off switch of an air flow source 108 (e.g., gas furnace, heat pump, air conditioner, etc.). Thus, the base station 106 can be installed in place of an existing thermostat using simple household tools and without re-wiring the structure.

The air flow source 108 can be any conventional air flow system typically installed in residential and commercial structures for providing conditioned (e.g., heated or cooled) air flow. The automated flow system 100, however, is particularly useful for conventional residential air flow systems, such as a gas furnace.

Base Station

Figure 2:
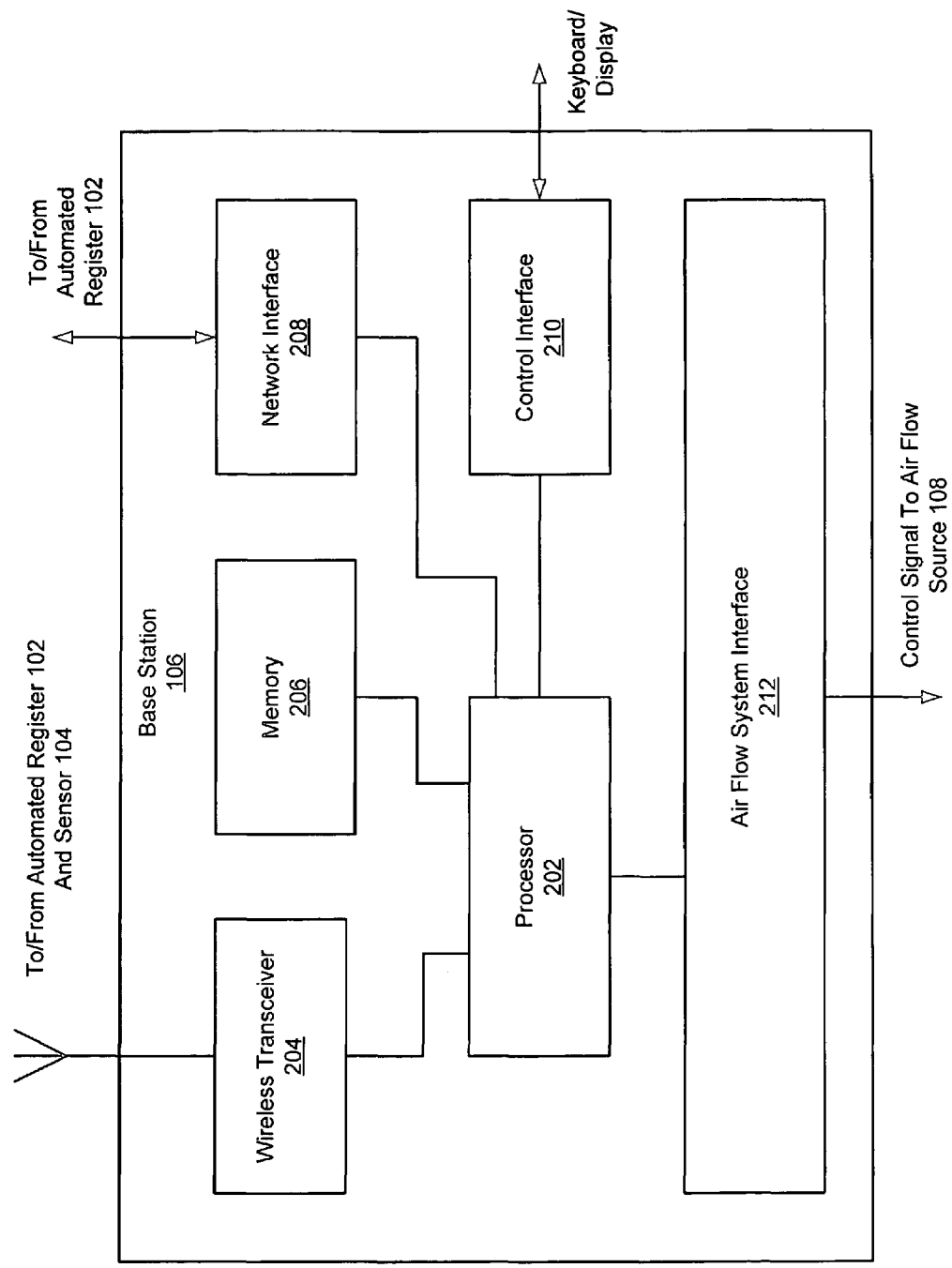
FIG. 2 is a block diagram of a base station.

FIG. 2 is a block diagram of the base station 106 shown in FIG. 1. The base station 106 generally includes a processor 202, a wireless transceiver 204, memory 206, a network interface 208, a control interface 210 and an air flow system interface 212.

The wireless transceiver 204 receives communication signals from the automated registers 102, where the signals are decoded into a binary data stream using well-known wireless communication techniques and protocols. An example of a wireless transceiver 204 suitable for use in the base station 106 is the RD0300 915 MHz OOK transceiver reference design provided by RF Micro Devices, Inc. (Greensboro, N.C.). The RD0300 is capable of providing two-way remote data transfers and can be connected directly to a microprocessor.

Data communicated by the automated registers 102 (hereinafter referred to as a "Register State") is decoded and extracted from a binary stream by the processor 202. The memory 206 is used to store various instructions for handling the decoding and extraction processes. An example of a suitable processor 202 for the base station 106 is the Motorola M68HC08 Family of 8-bit microcontroller units.

In some embodiments, the wireless transceiver 204 can also receive data directly from sensors 104 placed throughout the zone, which can provide temperature readings and other useful data about the zone.

The network interface 208 (e.g., Ethernet card) receives communication signals from the automated register 102 via a physical medium (e.g., cable, phone lines, etc.). The network interface 208 can be coupled to a home network (e.g., using X10 technology) to enable a user to configure the base station 106 remotely using a computing device on the network (e.g., Personal Computer, mobile phone, PDA). The network interface 208 also facilitates the downloading of data to the base station 106 from the Internet or other external networks.

The control interface 210 receives and interprets user key strokes from a keypad on the base station 106 and for displaying information to the user via a built-in display device (e.g., an LCD). Some exemplary information displayed to the user includes Actual Temperature, Target Temperature, Deadband, Register State and Battery Status for each automated register 102 in the automated air flow system 100. This information is described more fully with respect to Table I.

The air flow system interface 212 provides an electrical interface with the air flow source 108 and typically includes a control wire for providing on/off signals generated by the processor 202 to the air flow source 108 (e.g., a gas furnace on/off switch).

Automated Register

Figure 3:
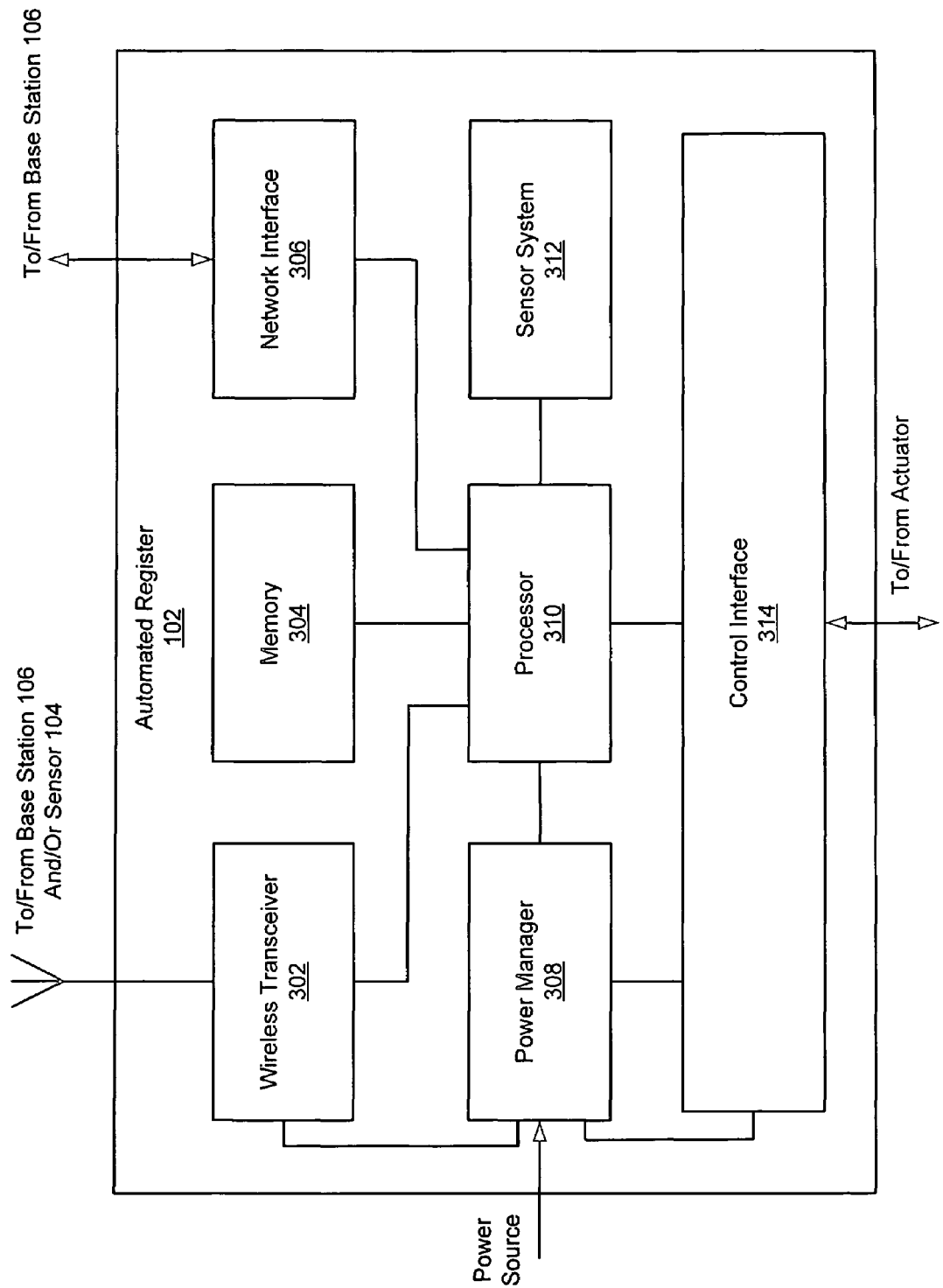
FIG. 3 is a block diagram of an automated register.

FIG. 3 is a block diagram of an automated register 102. The automated register 102 generally includes a wireless transceiver 302, a memory 304, a network interface 306, a power manager 308, a processor 310, a sensor system 312 and a control interface 314.

The wireless transceiver 302 receives data from the base station 106 and one or more sensors 104, including a temperature sensor. Note that the wireless transceiver 302 can also be based on the RD0300 915 MHz OOK transceiver reference design. The sensors 104 can be configured to provide reports to the automated registers 102 (or directly to the base station 106) on a predetermined schedule (e.g., once per minute) or in response to being polled by the automated register 102 or base station 106. If there are multiple sensors 104, the automated register 102 and/or base station 106 can poll each sensor 104 individually using a round-robin polling scheme or a priority-based scheme.

A Register State is maintained in memory 304 and updated periodically based on new sensor data (e.g., temperature data). The Register State is transmitted to the base station 106 in response to being polled by the base station 106 or on a predetermined schedule (e.g., once per minute). The Register State is stored in memory 206 in the base station 106, where it is used by the processor 202 to control the air flow source 108, as described with respect to FIG. 4.

The sensors 104 can also include other types of sensors, including motion detectors, sound detectors and light detectors. These additional types of detectors can be used to determine whether a particular zone in the structure is occupied. If a particular zone is not occupied for a period of time, then the automated registers 102 in those zones can be deactivated. The automated registers 102 can stay in an inactive state until the occurrence of a local wakeup event (e.g., someone enters the room and triggers the motion detector) or a remote wakeup event (e.g., a user manually activates the automated register 102 via the base station 106). In some embodiments, the automated registers 102 include an integrated sensor system 312. The integrated sensor system 312 includes one or more sensors that are directly connected to the processor 310 through appropriate interface circuitry.

The network interface 306 is used to connect the automated registers 102 to a network (e.g., X10, Ethernet). If the automated registers 102 are to be connected to a network, then the design of the automated registers 102 can be simplified by removing the wireless transceiver 302 from the automated registers 102 and the base station 108.

The power manager 308 is coupled to a power source (e.g., AC wall outlet, battery) and manages the power in the automated register 102. When the automated register 102 is not in operation or is otherwise inactive, then the automated register 102 can be placed in a low power or idle state to conserve energy. This can be a useful feature if a battery power source is used.

The control interface 314 includes control circuitry for controlling the actuators for opening and closing the automated register 102. Any actuator system that is capable of opening and closing a register can be used in the automated register 102, including electronic/electric motor actuators, electro-pneumatic or electro-hydraulic valves, solenoids, and associated gear assemblies and/or mechanical linkages. The Microflow 2000™ is an example of an off-the-shelf register that can be connected to the control interface 314 with minimal modifications.

System Configuration

In some embodiments, the automated air flow system 100 can be configured using a keyboard and LCD display integrated with the base station 106 or remotely through a personal computer or other computing device coupled to the base station 106 via a physical link (e.g., X10, copper) or a wireless link. A user interface enables the user to specify various system parameters. For example, the user can specify a different Target Temperature for each automated register 102 or designate certain automated registers 102 as Active or Inactive. An Inactive automated register 102 will remain in a Closed state to prevent air from flowing into the zone where it is located. This is a useful feature for zones that are not being used for longer periods of time. By inactivating automated registers 102 in certain zones, the air flow from the air flow source 108 can be redirected to the remaining Active zones to save energy and to enable the Active zones to reach their respective Target Temperatures more quickly. Table I below shows an exemplary user interface for configuring the automated air flow system 100.

TABLE I

User Interface

| Register ID | Zone | Register(s) State | Actual Temp. | Target Temp. | Deadband | Battery Status |
|---|---|---|---|---|---|---|
| 1 | Bedroom 1 | Active | 62° | 68° | 2° | Low |
| 2 | Bedroom 2 | Inactive | 58° | — | — | — |
| 3 | Family Room | Active | 65° | 70° | 2° | High |

In some embodiments, the user is provided with a display that includes the following information: Register ID, Zone, Register State, Actual Temperature, Target Temperature, Deadband, and Battery Status. Each automated register 102 has a Register ID and is assigned to a particular Zone in the structure. The Register Status of each automated register 102 (Active or Inactive) is also displayed. The user is allowed to enter a Target Temperature within a desired Deadband via the keyboard. The Deadband is used to prevent slight changes in Zone temperatures from triggering the automated register 102. When the Actual Temperature reaches the Target Temperature to within the Deadband, the automated register 102 is Closed, thereby redirecting air flow to other zones in the structure. The usefulness of the user interface shown in Table I is made clear by examining the first row of Table I.

Referring to the first row, Register 1 is Active and located in Bedroom 1. The Register 1 will remain Open until the Actual Temperature of 62 degrees reaches 66 degrees, which is within a 2 degree Deadband of the Target Temperature. Note that the Battery Status of Register 1 is low, reminding the user to replace or recharge the batteries in Register 1.

System Initialization

In some embodiments, the automated registers 102 will self-register with the base station 106. For example, when a new automated register 102 is installed and powered-up, it will send a registration signal to the base station 106 to signal its presence in the automated air flow system 100. An initialization code for the automated register 102 is stored in non-volatile memory 304. Upon power-up, the initialization code performs a self-diagnostic test of the automated register 102 components, then sends the registration signal to the base station 106. The registration signal will include a register identifier (e.g., 8-bits), which is stored in memory 206. Any errors in the initialization process will be sent to base station 106 and displayed to the user as an Error Code.

When the base station 106 is installed and powered-up it will execute an initialization code stored in non-volatile memory 206, which performs a self-diagnostic test of the base station 106 components. Upon completion of the self-diagnostic test, the base station 106 will execute a configuration routine to allow the user to program the automated air flow system 100, including specifying Zones, Register Status (e.g., Inactive, Active), Target Temperatures and Deadbands. These parameters are stored in memory 206 and are accessible by the processor 202.

In some embodiments, communications between automated registers 102 and sensors 104 and/or base station(s) 108 will use a bit-oriented protocol. An example of a data frame for a bit-oriented protocol is shown in Table II.

TABLE II

Frame Format

| Start Flag | Header | Payload | ECC | End Flag |
|---|---|---|---|---|

The Start and End Flag fields are unique sequences of binary numbers (e.g., 01111110 for an 8-bit protocol) to enable the receiver to delineate the beginning and end of the frame. The header field includes addresses of the receiving and sending devices and control information, the payload field includes information to be communicated between the sending and receiving devices, and the ECC field is used for error detection and correction using well-known error detection/correction techniques (e.g., parity checking, CRC, FEC, etc.). The payload information will preferably include sensor and automated register information (e.g., Actual Temperature), Register State (e.g., Active, Inactive, Open, Closed), Error Codes, etc. The sensor information can be represented in binary form using well-known transmission codes (e.g., ASCII).

System Operation

Figure 4:
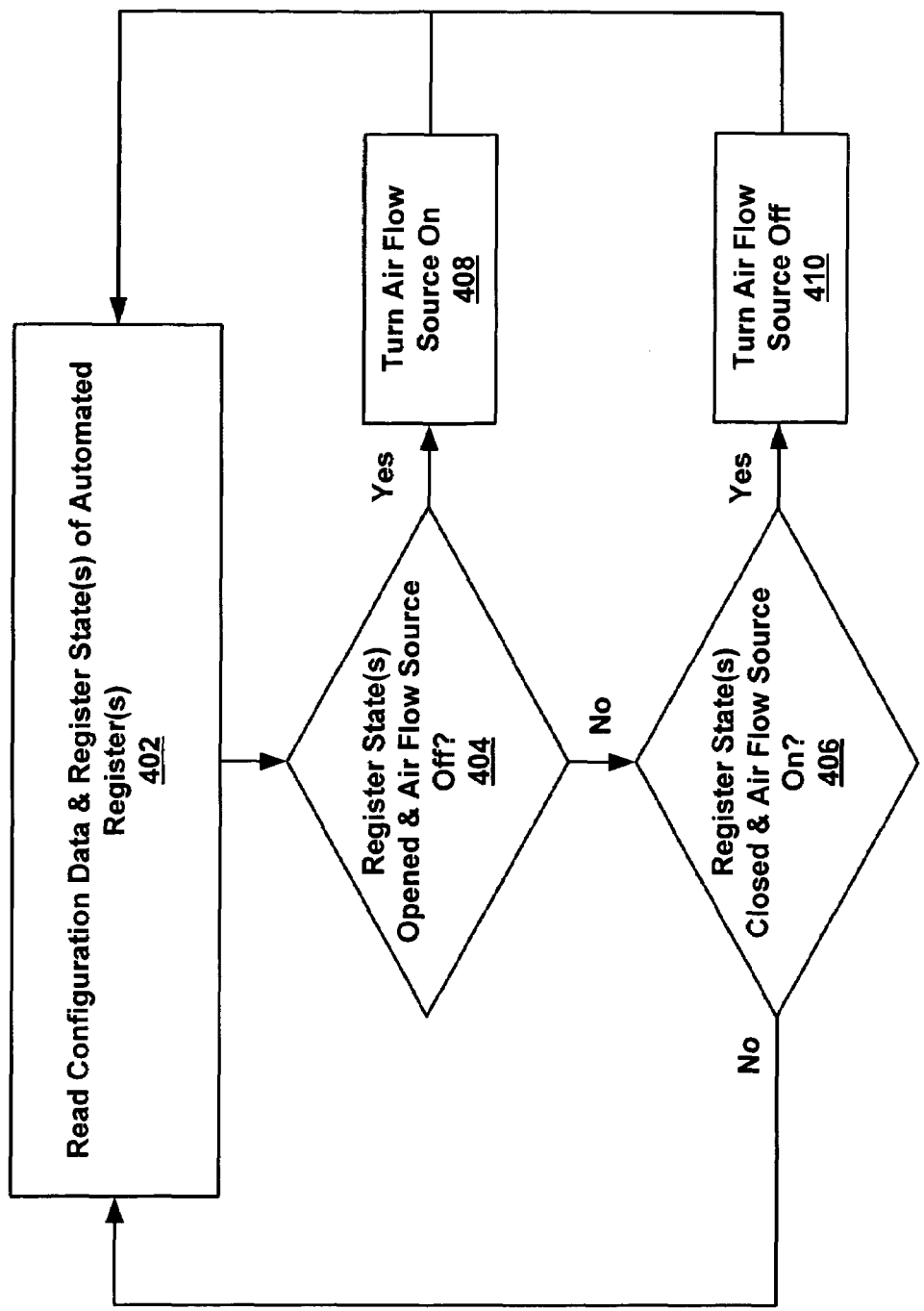
FIG. 4 is a flow diagram of an automated air flow process performed by the base station show in FIG. 2.

FIG. 4 is a flow diagram of an automated air flow process performed by the base station 106 show in FIG. 2. The automated air flow process begins when the automated registers 102 and base station 106 are initialized, the automated registers 102 have registered with the base station 106 and the user has specified a desired configuration. The processor 202 reads 402 configuration data from memory 206 for each automated register 102. The processor 202 also reads 402 the Register State for each automated register 102 received via the wireless transceiver 204 or network interface 208. The Register States Opened and Closed can be determined with one or more detectors (e.g., proximity switch, photo-eye) in the automated register 102. The processor 202 examines the Register State to determine 404 whether the Register State is Opened and the air flow source 108 (e.g., gas furnace) is turned-off. If the Register State is Opened and the air flow system 110 is turned-off, then the base station 106 turns-on 408 the air flow source 108. Otherwise, the processor 202 determines 406 if the Register State is Closed and the air flow source 108 is turned-on. If the Register State is Closed and the air flow source 108 is turned-on, then the air flow source 108 is turned-off 410.

In some embodiments, the base station 106 receives Actual Temperature data directly from the sensors 104 or indirectly via the automated registers 102. The processor 202 compares the Actual Temperature data with Target Temperatures, then sends Open or Closed commands to the automated registers 102 based on the comparisons. If an automated register 102 receives an Open command, then it will open to enable conditioned air to flow into the zone. If an automated register 102 receives a Closed command, then it will close to prevent conditioned air from entering the zone. This action results in conditioned air being redirected to other zones that have not reached their Target Temperatures. In some embodiments, the opening and closing of an automated register 102 is determined by processor 310 in the automated register 102, as described more fully with respect to FIG. 5.

Figure 5:
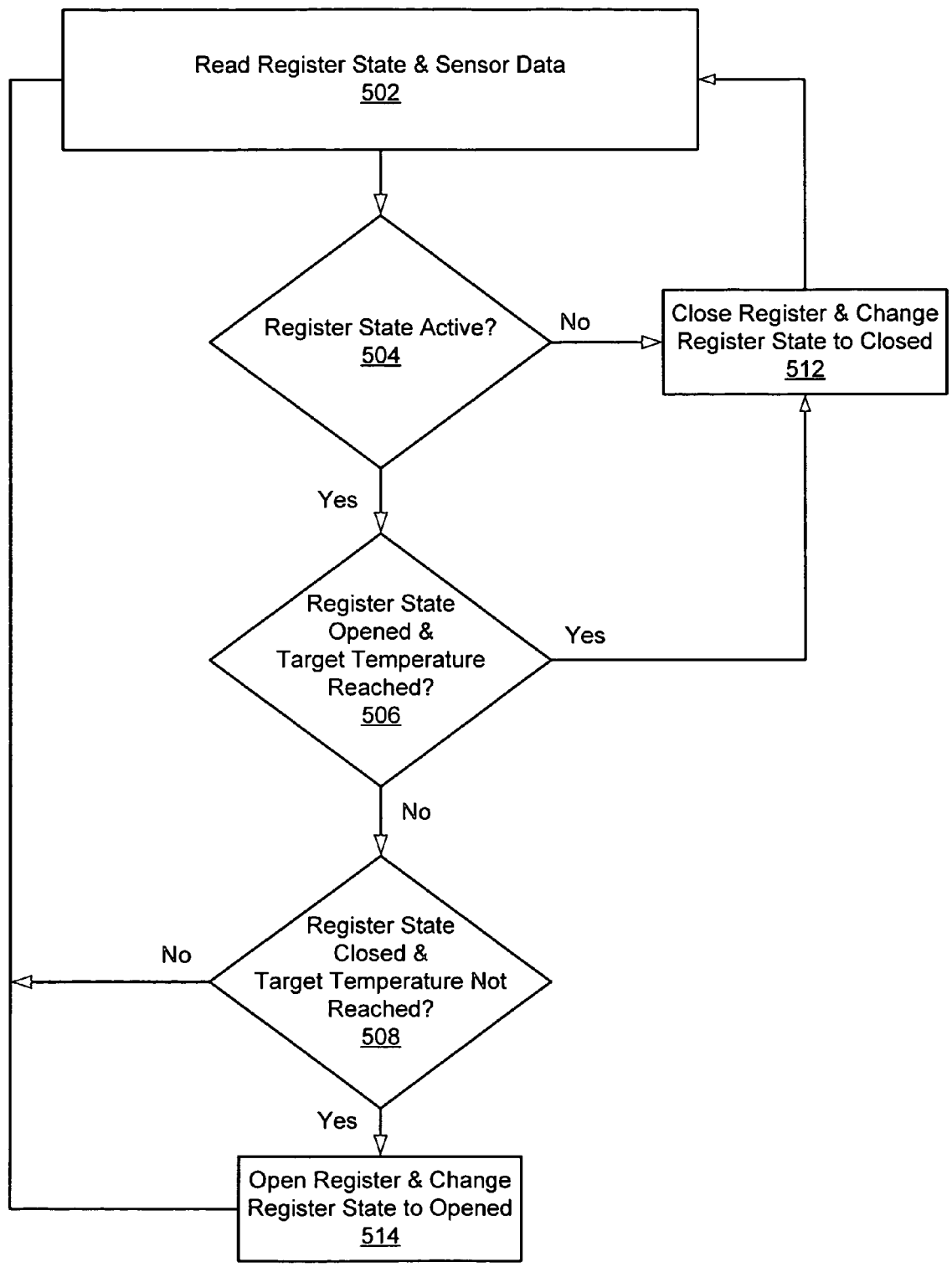
FIG. 5 is a flow diagram of an automated air flow process performed by the automated register shown in FIG. 3.

FIG. 5 is a flow diagram of an automated air flow process performed by the automated register 102 shown in FIG. 3. The automated air flow process begins when the automated registers 102 are initialized and registered with the base station 106. The processor 310 reads 502 the Register State and sensor data from sensors 104. The sensor data preferably includes the Actual Temperature, which is compared by the processor 310 against a Target Temperature stored in memory 304 to determine if the Target Temperature has been reached within the specified Deadband. If the Register State is Inactive 504, then the processor 310 commands the automated register 102 to close 512, and the Register State is updated to reflect the Closed state and sent to the base station 106. If the Register State is Opened and the Target Temperature is reached 506, then the processor 310 commands the automated register 102 to close 512, and the Register State is updated to reflect the Closed state and sent to the base station 106. If the Register State is Closed and the Target Temperature is not reached 508, then the processor 310 commands the automated register 102 to open 514, and the Register State is updated to reflect the Opened state and sent to the base station 106.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the invention and its practical applications, to thereby enable others skilled in the art to best utilize the invention and various embodiments with various modifications as are suited to the particular use contemplated.

What is claimed is:

1. An automated air flow system for controlling the flow of conditioned air into multiple zones of a structure, comprising:
   an automated register configured to receive temperature data from at least one temperature sensor in at least one zone and to control the flow of conditioned air into the at least one zone in response to the temperature data; and
   a base station in communication with the automated register and adapted to be coupled to an air flow source for providing the conditioned air, the base station configured to receive status data from the automated register and to control the air flow source based on the status data.

2. The system of claim 1, wherein the automated register and the base station are communication via a wireless link.

3. The system of claim 1, wherein the status data indicates whether the automated register is in an opened or closed state.

4. The system of claim 1, wherein the status data indicates whether the automated register is in active or inactive state.

5. The system of claim 4, wherein the status data is determined in part by motion detection data received from a motion detector.

6. The system of claim 1, wherein the temperature data includes an actual temperature to be compared against a target temperature specified by a user.

7. The system of claim 1, wherein the automated register includes a power manager for commanding the automated register from a first power state to a second power state in response to the status data, wherein the first power state consumes more power than the second power state.

8. The system of claim 1, wherein the automated register and the base station communicate via a physical link.

9. The system of claim 1, wherein the automated register receives status data from a network.

10. The system of claim 1, wherein the status data is specified by a user operating a remote computing device on a network.

11. A method of automatically controlling the flow of conditioned air into multiple zones of a structure, comprising:
   specifying target temperatures for a plurality of zones, wherein at least two zones have a different target temperature;
   enabling an air flow source to provide conditioned air to each zone using an automated register until each zone reaches its respective target temperature;
   responsive to a zone reaching its target temperature, automatically redirecting the conditioned air from that zone to zones that have not reached their respective target temperatures by closing the automated register; and
   responsive to the closure of the automated register,
   preventing the air source from providing conditioned air to the zones.

12. The method of claim 11, further comprising:
   automatically redirecting the conditioned air from inactive zones to active zones.

13. An automated air flow system for controlling the flow of conditioned air into multiple zones of a structure, comprising:
   a plurality of automated registers, wherein selected ones of the plurality of automated registers that are located in zones that have reached target temperatures are configured to automatically redirect conditioned air to zones which have not reached target temperatures, wherein at least two zones have different target temperatures; and a base station adapted to be coupled to an air source for providing conditioned air to the zones, the base station configured to turn-off the air source in response to status data from the automated registers indicating that at least some zones have reached their respective target temperatures.

14. The system of claim 13, wherein the automated register and the base station are in communication via a wireless link.

15. The system of claim 13, wherein the status data indicates whether the automated registers are in opened or closed states.

16. The system of claim 13, wherein the status data indicates whether the automated registers are in active or inactive states.

17. The system of claim 16, wherein the status data is determined in part by motion detection data received from a motion detector.

18. The system of claim 13, wherein the automated registers include power managers for commanding the automated register from a first power state to a second power state in response to the status data, wherein the first power state consumes more power than the second power state.

19. The system of claim 13, wherein the automated registers include power managers for commanding the automated register from a first power state to a second power state in response to the status data, wherein the first power state consumes more power than the second power state.

20. The system of claim 13, wherein the automated registers and the base station communicate via a physical link.

* * * * *